June 23, 1925.  
J. W. BRAUTIGAM  
1,543,597  
FRAMING DEVICE FOR MOTION PICTURE MACHINES  
Filed Aug. 31, 1922

John W. Brautigam, INVENTOR

BY Victor J. Evans
ATTORNEY

WITNESS: Fred W. Ely

Patented June 23, 1925.

1,543,597

UNITED STATES PATENT OFFICE.

JOHN W. BRAUTIGAM, OF BRONX, NEW YORK.

FRAMING DEVICE FOR MOTION-PICTURE MACHINES.

Application filed August 31, 1922. Serial No. 585,457.

*To all whom it may concern:*

Be it known that I, JOHN W. BRAUTIGAM, a citizen of the United States, residing at Bronx, in the county of Bronx and State of New York, have invented new and useful Improvements in Framing Devices for Motion-Picture Machines, of which the following is a specification.

This invention relates to motion picture apparatus and more particularly to framing mechanism.

An important object of the invention is to incorporate in a power transmitting means for intermittently moving the film across the framing aperture, a means for adjusting the film with respect to the aperture by utilizing the components of the transmitting means.

Another object of the invention is to provide a combined film feeding and framing mechanism which shall be simple of construction and absolutely reliable of operation.

With the above and other objects in view which will appear as the nature of the invention is better understood, the same consists in the improved construction and novel arrangements of parts which will hereinafter be fully described and particularly pointed out in the claims.

In the accompanying drawings, has been illustrated a single and preferred form of the invention, it being, however, understood that no limitations are necessarily made to the precise structural details therein exhibited, but that changes, alterations and modifications within the scope of the claims may be resorted to when desired.

Figure 2:
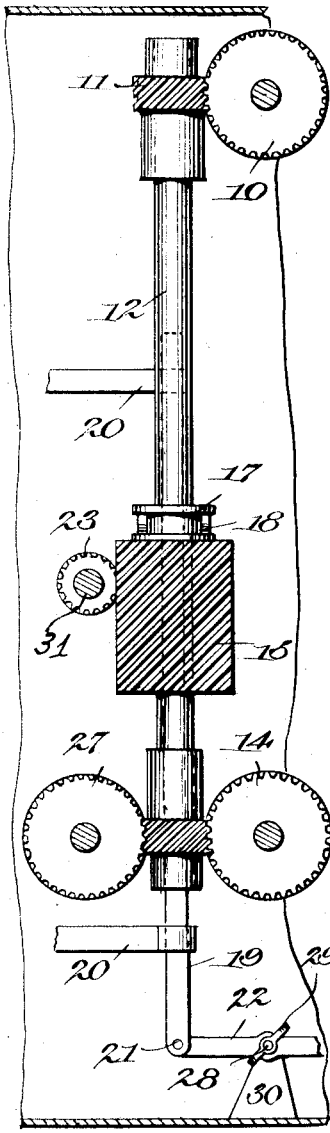
Figure 2, is a section taken approximately on line 2—2 of Figure 1.
Figure 1:
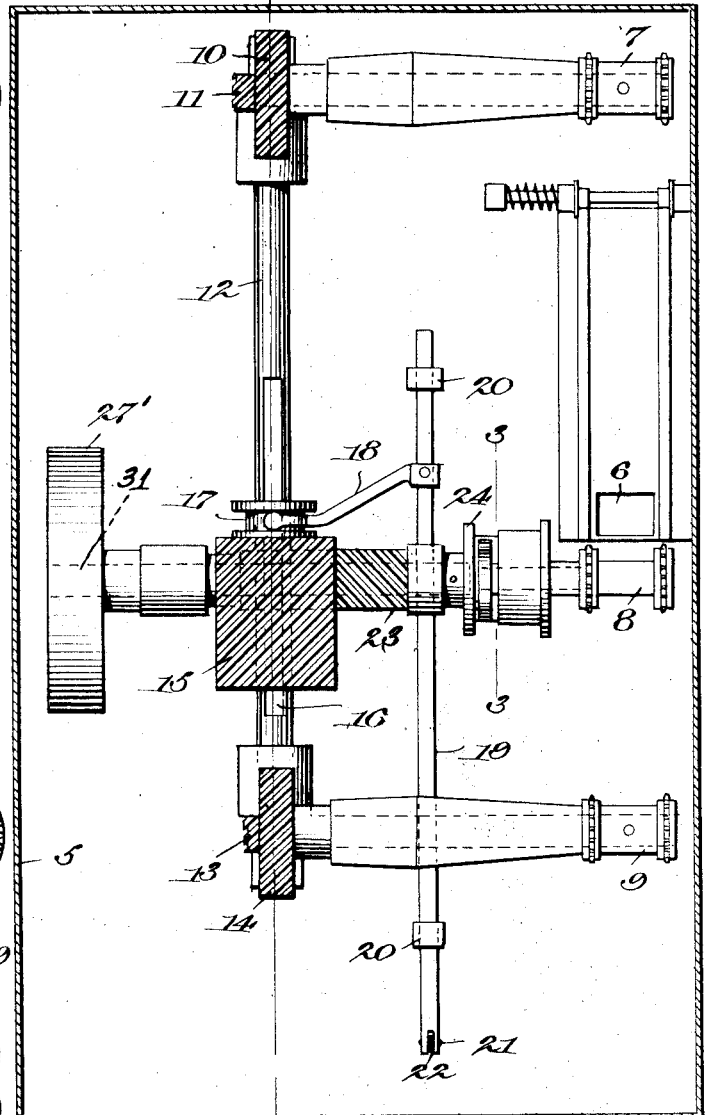
Figure 1 is a vertical section through the housing of a motion picture apparatus.
Figure 3:
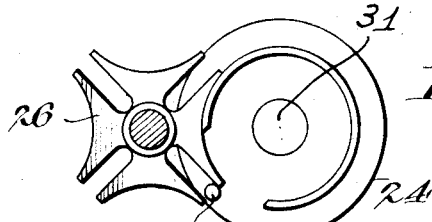
Figure 3, is a section taken on line 3—3 of Figure 1.

In the drawings, 5 represents the housing of a motion picture apparatus, the same having one of its walls provided with the customary frame aperture 6, over which the film is adapted to be intermittently drawn. Above the aperture 6 is a film feeding sprocket 7 which operates to pull the film down in the direction of the aperture 6. Immediately beneath the aperture 6 is a sprocket 8 which operates in a manner to be hereinafter explained to move the film intermittently across the frame aperture. Beneath the sprocket 8 is a driven take-up sprocket 9 which operates to draw the film away from the aperture as the pictures are successively presented thereto.

The shaft of the sprocket 7 is provided with a worm gear 10 which is in constant mesh with a worm 11 on a driven shaft 12. This shaft also carries a worm 13 in constant mesh with a worm gear 14 on the shaft of the sprocket 9.

The aforesaid shaft 12 is provided with a sliding worm gear 15 operatively keyed at 16 to rotate with said shaft and provided at one end with a grooved portion 17 which accommodates an actuating arm 18 on a slide rod 19. This slide rod moves in bearings 20 in the housing 5 and same is pivoted at 21 to a rocking lever 22 in said housing 5. This lever 22 can be manually operated so as to impart sliding movement in either direction of the worm gear 15.

The teeth of the worm gear 15 are arranged approximately at an angle of 45 degrees to the axis of the shaft 12 and same are in mesh with correspondingly formed teeth on a worm 23 mounted upon a horizontally disposed shaft 31. The shaft 31 of the worm 23 is provided with a cam 24 which forms part of a well known Geneva movement and same is provided with the usual form of pin 25 adapted to co-act with a star wheel 26 on the shaft of the sprocket 8. In this manner it will be observed that power is taken into the sprocket 8 so that the film is drawn intermittently over the frame aperture 6. In order to balance rotation of the shaft on which the worm 23 is mounted I provide same with a fly wheel 27'.

In operation of the mechanism, the film is run over the sprockets 7, 8 and 9 and when the shaft on which the worm 23 is mounted is placed in motion, the film will be intermittently moved across said aperture 6. Should the picture sections of the film get out of operative registration with the aperture 6, motion may be imparted to the worm 15 to move same transversely across the worm 23 while in operative intermeshing engagement therewith and in so doing, the worm 23 will be turned in one direction or another according to the direction of movement imparted to the worm 15 so as to bring about quick and operative framing of the picture. It will be understood from the arrangement of parts herein referred to that my improved framing mechanism consists of parts that constitute the active and direct driving mechanism for moving the film intermittently across the aperture 6.

Power is supplied to the shaft 12 by means of a driving worm gear 27 as shown in Figure 2.

In order to hold the worm gear 15 in its position of adjustment on the shaft 12, I provide the fulcrum pin 28 of the lever 22 with a thumb nut 29 which operates to induce friction between the lever 22 and its supporting bracket 30. Any other well known means may be substituted for this means in order that said worm gear can be held in its adjusted position.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

I claim:—

1. In a motion picture machine, means for moving a film intermittently across a frame aperture, said means including a Geneva movement, and means for actuating said movement, the actuating means including co-acting devices mounted upon shafts disposed at right angle to each other, one of the devices being slidable on its shaft and means for changing the relative positions of the devices while operating the same to affect the Geneva movement to cause the film to be shifted with respect to the frame aperture.

2. In a motion picture machine, means for moving a film intermittently across a frame aperture, said means including a Geneva movement, and mechanism for driving said movement and for controlling operations thereof to shift the film in either direction with respect to said frame aperture so as to establish operative registration of the picture with said aperture, said mechanism including a horizontal shaft having a worm gear keyed thereon, a vertical shaft mounted adjacent said horizontal shaft, a worm gear keyed to said vertical shaft for co-acting engagement with said first worm gear, and manually operable means for moving said last worm gear with relation to the first worm gear.

3. A motion picture machine including means for intermittently moving a film over a frame aperture and including a worm gear, a driven shaft mounted at right angles to the axis of said worm gear, a worm gear slidable on the driven shaft and in constant mesh with the first said worm gear, means for sliding the second worm gear across the first gear including a manually operable clutch, and means for holding the sliding gear in its position of adjustment.

4. In a motion picture machine, means for moving a film intermittently across a frame aperture, said means including a sprocket stationarily mounted with respect to the frame aperture, a driven shaft, a Geneva movement, a worm gear mounted on said driven shaft, a drive shaft journalled at right angle to the axis of the driven shaft, a worm gear slidable on said drive shaft and co-acting with said first worm gear, and means for sliding said last worm gear on said drive shaft to impart movement to the first worm gear for driving the Geneva movement to cause the rotation of said sprocket to shift the film with respect to the film aperture.

5. In a motion picture machine, means for moving a film intermittently across a frame aperture, said means including a sprocket stationarily mounted with respect to the frame aperture, a driven shaft, a Geneva movement, a worm gear mounted on said driven shaft, a drive shaft journalled at right angle to the axis of the driven shaft, a worm gear slidable on said drive shaft and co-acting with said first worm gear, a groove formed on said last worm gear, and means for sliding said last worm gear on said drive shaft to impart movement to the first worm gear for driving the Geneva movement to cause the rotation of said sprocket to shift the film with respect to the film aperture, said means including an arm for co-action with the groove of said last worm gear.

In testimony whereof I have affixed my signature.

JOHN W. BRAUTIGAM.